Dec. 5, 1944.  O. SHECK  2,364,321
WATER MEASURING TANK
Filed March 20, 1942
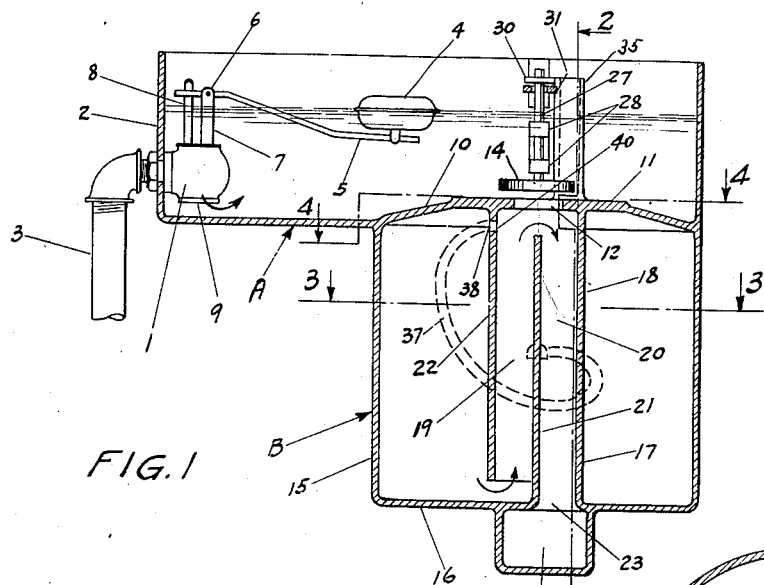
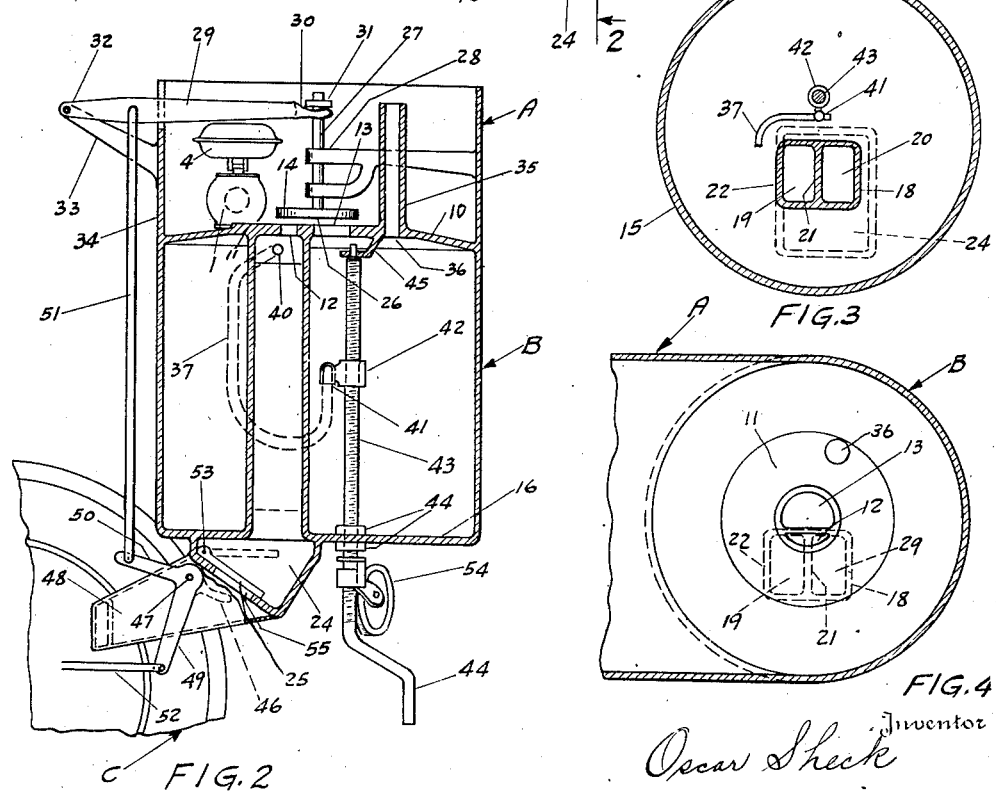
Inventor
Oscar Sheck
By Robb & Robb
Attorneys Patented Dec. 5, 1944

2,364,321

UNITED STATES PATENT OFFICE 2,364,321

WATER MEASURING TANK

Oscar Sheck, Milwaukee, Wis., assignor to Koehring Company, Milwaukee, Wis., a corporation Application March 20, 1942, Serial No. 435,585

8 Claims. (Cl. 222—416)

The present invention relates to devices for measuring the quantity of water delivered to mixing devices, or the like, and more particularly, to concrete mixers, where it is desired that the amount of water delivered be controlled within very accurate limits.

As is well known in the concrete paving art, the structural strength of concrete is largely determined by the amount of water added to the aggregates and the facility with which the mixing of the aggregate and water, or other material, takes place determines the actual amount of work that may be done within a given period.

In devices of this type that are used at the present time, the parts which comprise the same are generally rather complicated and, of necessity, are not arranged in compact relationship.

In the particular use of the measuring device to be described, it is desirable to provide a compact unit which will not unnecessarily extend very much above the superstructure or framework of the paver, or the like, to which the same is fixed, and at the same time, will facilitate the rapid introduction of water into the mixing drum in which it is finally used.

In accordance with the above set forth requirements, it is an object of this invention to provide a compact water measuring device adapted to be mounted on a concrete paving machine, or the like, in a suitable position, and to be operated in a rapid and efficient manner to effect the delivery of the water to the mixing drum where it is used.

A further object of this invention is to provide a novel form of siphon construction within the measuring tank whereby the flow of water and thus the quantity of water will be gauged within very accurate limits as controlled by adjustable means therefor.

Another object of this invention is to provide a novel adjusting means for the air tube connected with the siphoning means, whereby the quantity of water delivered to the mixer may be maintained within accurate limits as determined by the adjustment of the air hose or siphon breaking connection.

A still further object of this invention is to provide a unitary supply tank and measuring tank structure with means to control the supply of water to the supply tank and coordinated means to regulate the flow of water from the supply tank to the measuring tank and from the measuring tank by the novel form of siphoning means above mentioned.

A further object of this invention is to provide a novel arrangement of measuring tank and siphon means, whereby the siphoning action will not be prematurely interrupted by leakage of air into the siphon connection.

A further object is to provide instantaneous starting and stopping of the flow of liquid by siphoning action including means to vary the quantity of liquid delivered within very exact limits.

Further and more particular objects of this invention will be set forth in the accompanying specification and disclosed in the claims.

In the drawing:

Figure 1 is a vertical sectional view taken substantially centrally of the mixing device, and illustrating the control valves and siphon tube arrangement therein, certain parts being omitted.

Figure 2 is a vertical sectional view taken about on the line 2—2 of Figure 1, further illustrating certain features of the device, and particularly the siphon breaking means or air tube connected with the siphon tube.

Figure 3 is a horizontal sectional view taken about on the line 3—3 of Figure 1, looking down therein, showing the formation of the measuring tank and the siphon tube situated therein.

Figure 4 is a top view of the measuring tank, taken about on the line 4—4 of Figure 1, looking in the direction of the arrows, and shows the disposition of the valve openings in the top of said tank, and their relationship with the siphon tube located in said tank.

Referring now to Figure 1, there is shown substantially a rectangular supply tank A having engaged therewith at one end and below the same a measuring tank B, the tanks A and B being of water tight construction and integrally connected together to perform the water holding function of the device, the said water being delivered in a manner to be described.

Adjacent one end of the supply tank A, there is shown a water level control valve 1, suitably engaged with the end 2 of said tank, and adapted to be supplied by a supply pipe 3 engaged therewith, in a conventional manner through the wall of said side 2. The water level control valve 1 is float actuated by means of a float 4 suitably engaged near the end of a lever arm 5, the said lever arm 5 being in turn pivotally supported at 6 on a support 7 engaged with the valve body of the said water level valve.

The opposite end of the lever 5 is engaged with a plunger member 8 adapted to operate in the interior of the valve in a manner to restrict and permit the flow of water from the bottom opening therein. This valve 1 may be of generally conventional construction in the art of float controlled valves, and is adapted to be actuated to permit the flow of water into the supply tank when the water level in said tank has been lowered by flow therefrom to the measuring tank B in a manner to be described.

It will be apparent that when the float 4 is lowered, the lever arm 5 is actuated, and in accordance with conventional practice, the valve 1 is operated to permit the flow of water, as above set forth.

Adjacent one end of the supply tank A is the previously referred to measuring tank B, the top portion 10 of which forms a portion of the bottom of the supply tank.

As will be noted, upon reference to the drawing of Figure 1, the said top portion 10 is formed to provide a raised seat or valve opening section 11 substantially centrally of the said member 10. Suitable openings 12 and 13 are provided in the valve portion of the top member 10 of the measuring tank, and adapted to be opened and closed by means of an inlet valve generally designated 14. Further reference will be made to the operation of the valve in conjunction with the openings, as the description of the device proceeds.

The measuring tank B, previously mentioned as being mounted below the supply tank A, is generally circular in conformation, having the outer wall 15 suitably engaged at its upper edges with the bottom portion of the supply tank A and a bottom member 16 adapted to close the circular opening formed by the said wall. Interiorly of the measuring tank B and substantially centrally thereof is provided a novel form of siphon tube 17, which for the purposes of this invention may generally be formed in a single unit for rectangular construction.

The outer wall 18 of said unit being rectangular in conformation, as above set forth, is connected at its upper end with the seat portion 11 of the top 10 of the said measuring tank B by welding preferably. The interior of the siphon tube 17 is divided into two branches, an inlet branch 19 and an outlet branch 20 having a common wall 21 therebetween. The cross-sectional area of the inlet branch 19 of the siphon tube is generally the same as that of the outlet branch 20, as will be seen upon reference to Figure 3, the wall 21 dividing the said tube into the two referred to branches.

Referring again to Figure 1, it will be seen that the branch 20 is connected at its bottom or lower end with the bottom wall 16 of the measuring tank, the dividing wall 21 which forms a wall of the said branch extending upwardly to a point a short distance from the seat portion 11 of the top member of the measuring tank. The wall portion 22, comprising generally the outer wall of the inlet branch of the said siphon tube, is connected at its upper end with the under side of the seat portion 11, previously referred to, and extends downwardly to a point just short of the bottom 16. The outlet branch 20, previously referred to, is suitably connected with an opening 23 in the bottom 16 of the tank B, the said opening leading to a valve chamber 24 having a valve member 25 operable therein in a manner to be described. The siphon tube thus provided is a substantially inverted U shaped tube although of integral construction, as above described.

Referring to Figure 2, this view discloses that the seat portion 11 of the top member of the measuring tank B is provided with the previously mentioned openings 12 and 13, the opening 12 adapted to permit the flow of water from the supply tank A into the interior of the siphon tube 17, and the opening 13 is adapted to permit the flow of water from the said supply tank into the interior of the measuring tank B. The flow of water, above mentioned, is controlled by the valve 14, previously referred to, the said valve 14 comprising a flat seat member, suitably connected with a lift rod 27, the said lift rod being supported for vertical movement in guide members 28, the said guide members being suitably fastened to the interior of one of the walls of the said supply tank.

A lever arm 29 is provided with a bifurcated end 30 adapted to surround the lift rod 27 and engage a collar 31 adjacent the end thereof, and is provided exteriorly of the supply tank at 32, the said pivot being supported on an arm 33 engaged with the exterior of wall 34 of the said supply tank.

It will be seen that upon a lowering movement of the lever arm 29 of the valve 14, the valve member will be permitted to move into engagement with the surface of the seat portion 11 of the top member of the measuring tank over the openings 12 and 13 provided therein, and thus effectively prevent any flow of water from the said supply tank into the measuring tank. The valve member 14, just referred to, is generally termed an inlet valve, since its function is to provide the regulation of the flow of water from the supply tank A into the measuring tank B.

A venting means 35 is provided in the form of a pipe suitably extending from an opening 36 in the seat member 11 of the top of the measuring tank and adapted to extend upwardly interiorly of the supply tank, whereby atmospheric air is permitted to flow into the measuring tank B during the flow of water therefrom in a manner to be described.

Interiorly of the measuring tank B is provided an air tube or siphon breaking tube 37 of flexible construction engaged at one end 38 with a suitable opening 40 in the inlet branch of the siphon tube 17 and the other end 41 is supported on a nut member 42, the said nut member 42 being threaded interiorly thereof and engaged with a threaded shaft 43 adapted to be operated by means of a crank member 44 exteriorly of the measuring tank B, the said threaded member 43 extending through the bottom 16 of the said tank in a substantially vertical direction through an opening suitably formed therein and provided with water tight bearing members 44. The upper end of the threaded shaft 43 is supported on arm abutment 45 connected with the lower side of the seat portion 11 of the top of the measuring tank B, in a bearing member at the end thereof.

Adjacent the bottom 16 of the measuring tank B is provided the outlet valve chamber 24, previously referred to, having operable therein the valve member 25 suitably pivotally engaged with the said chamber and adapted to be operated by means of a lever member 46 supported on a pivot 47 extending transversely of a nozzle member 48 and interiorly of the nozzle member, the said pivot 47 extending outwardly whereby the same may be engaged rigidly with a bell crank lever 49.

The ball crank lever 49 is engaged by means of one of its arms 50 with a rod 51 connecting the said lever pivotally with the inlet valve lever 29, previously referred to. A suitable operating rod 52 is pivotally engaged with the other arm of the bell crank lever 49 adapted to be operated by a skip, or the like, in a manner to be described.

The interior valve lever 46, previously mentioned, is adapted to operate through a discharge opening 55 to actuate the valve member 25 about a pivot 53 in a manner that will be apparent. The bell crank lever 49 is adapted to actuate the inlet valve 14 and the outlet valve 25 in a manner to close the said inlet valve before the outlet valve is opened, for purposes that will be understood from a consideration of the cycle of operation now to be described.

Assuming that there is no water in either of the tanks A or B, as at the start of a day's operation of the mixer C adapted to be supplied by water measured in the device being discussed, the bell crank lever 49 is first actuated in a manner to close the outlet valve 25 and thereby open the inlet valve 14 by means of the rod 51. Thereafter, the water supply is turned on through a connection, not shown, and water is permitted to enter the supply tank A in view of the fact that the float 4 of the float valve 1 is in a lowered position.

It will be apparent then that the water flowing into the supply tank will likewise flow through the openings 12 and 13 into the measuring tank, and thus fill the measuring tank, and in turn, the supply tank up to a predetermined level whereby movement of the float through the lever 5 will close the float valve. Thereafter, at the desired point in the operation of the machine C to be supplied with water, the bell crank lever 49 is shifted in a counterclockwise direction, thus permitting the valve member 14 to move into engagement with the seat portion 11 of the upper part of the measuring tank, and thus close the openings 12 and 13.

Subsequent movement of the said bell crank lever 49 will permit the valve 25 to be opened, and flow of water will commence through the said member. It will be apparent that as the water flows from the outlet branch 20, of the siphon tube, a siphoning action will be put into effect, drawing the water from the measuring tank around the lower end of the wall 22 of the inlet branch of said siphon tube, and thence upwardly over the dividing wall 21 between the two branches, thence downwardly and outwardly through the outlet branch of the said siphon tube 17.

In this manner, the water in the measuring tank may be dispensed to a point determined by the height of the end 41 of the air tube or siphon breaking device 37. When the water reaches the level of the opening in the end 41 of the said tube, it will be apparent that air admitted through the vent 35 will be directed by means of the air tube 37 through the opening 40 into the inlet branch of the siphon tube, and thus the siphoning action will be discontinued.

It is thus seen that by raising or lowering the nut member 42 of the measuring control device by rotation of the handle 44, a predetermined quantity of water may be permitted to flow into the concrete mixer or other device. A suitable metering attachment 54 may be provided and connected with the screw 43 whereby the exact number of gallons to be dispensed may be determined by suitable calibration of said device.

It is notable that any tendency for air to prematurely enter the siphon tube is obviated by the novel manner in which the inlet valve 14 is disposed adjacent the junction of the inlet branch and the outlet branch of said tube. Thus, if there were any leakage at all through the said valve beneath the seat member 26, thereof, this leakage would be in the form of water and not air, and there would be no tendency on the part of the valve to interrupt the siphoning action desired.

From the foregoing, it will be apparent that there has been set forth in this description and shown in the drawing, a novel form of water measuring device incorporating compact instrumentalities for effecting a siphoned delivery of water, or the like to a place of use.

The metering device above referred to is disclosed more specifically in Patent No. 2,003,153 to E. H. Lichtenberg, issued on May 28, 1935, and it is, therefore, not further described herein, the manner of application of the same to the present device, being readily perceived by those skilled in the art.

The present invention embodies improvements in the type of measuring device disclosed in the above named patent, one novel departure therefrom being the elimination of a relief valve and the necessity for use of the same. Leakage of air into, or trapping of air in, the siphon tube itself being of novel construction and disposed entirely within the measuring tank, likewise being eliminated.

Having thus described my invention, what I claim as new and desire to secure by Letters Patent of the United States, is:

1. In a water measuring device, in combination, a water supply tank, a water measuring tank therebeneath, the top of said tank being integral with the bottom of said supply tank, a siphon tube in said measuring tank, including inlet and outlet branches, the junction of said branches being integral with the bottom of said supply tank, valve means disposed in said supply tank adjacent the same junction and operable to control flow of water from the supply tank to the siphon tube and measuring tank, and a discharge valve operable to control the flow of water from the outlet branch of said siphon tube and measuring tank.

2. A device as claimed in claim 1, wherein the valve means in the supply tank comprises a single flat seat member operable to seat on adjacent water flow openings in the bottom of said supply tank, one opening leading to the siphon tube and the other to the measuring tank.

3. A device as claimed in claim 1, wherein the valve means in the supply tank and the discharge valve are interconnectedly operable, whereby flow of water from the supply tank to the measuring tank and siphon tube is prevented and the siphoning action is facilitated when the discharge valve is subsequently opened.

4. In combination, a water measuring tank, water supply means therefor, a vertical inverted U-shaped siphon tube disposed in said measuring tank, means establishing communication between the water supply means, the upper portions of the measuring tank and U portion of the siphon tube, said tube having an inlet at the lower end of one branch adjacent the bottom of the measuring tank and an outlet at the lower end of the other branch located at a point exterior to the measuring tank, valve means to open and close the points of communication of the supply means to the siphon tube and measuring tank, valve means to close the outlet end of the siphon tube, and adjustable air inlet means for the siphon tube disposed in the measuring tank.

5. The combination as claimed in claim 4, including operating means for said first named valve and said second named valve, and actuating means for said operating means whereby the first mentioned valve is closed before the second mentioned valve is opened to permit flow of water from said measuring tank.

6. In a water measuring device, in combination, a horizontal supply tank, a vertical measuring tank engaged therewith and therebeneath, an outlet valve for said tank, a vertical siphon tube in said measuring tank comprising inlet and outlet branches, said outlet branch leading to an opening in the bottom of said tank, an outlet valve controlling said opening, the junction of the branches being connected with the top of said tank, an inlet valve controlling flow of water from said supply tank to said junction portion and said measuring tank, and means for operating said inlet and outlet valves whereby flow of water from said measuring tank through the siphon tube is controlled.

7. A device as claimed in claim 6, wherein the means for operating the inlet and outlet valves comprises lever arms, and a rod interconnecting the same and actuating means for said rod, whereby the inlet valve is moved to closed position before the outlet valve is opened.

8. A water measuring device, in combination, a supply tank, a measuring tank therebeneath, an outlet valve for said measuring tank, a vertical siphon tube in said measuring tank including inlet and outlet branches, said outlet branch leading to an opening in the bottom of said measuring tank, an outlet valve controlling said opening, the siphon tube being connected to an opening in the supply tank, an inlet valve for controlling flow of water through the opening of said suppply tank to the measuring tank, and means for operating said inlet and outlet valves whereby flow of water from said measuring tank through the siphon tube is controlled.

OSCAR SHECK.